United States Patent
Kwak et al.

(10) Patent No.: US 11,316,207 B2
(45) Date of Patent: Apr. 26, 2022

(54) AQUEOUS ELECTROLYTE AND ENERGY STORAGE DEVICE COMPRISING THE SAME

(71) Applicant: LG CHEM, LTD., Seoul (KR)

(72) Inventors: Hoyoung Kwak, Daejeon (KR); Seokhyun Yoon, Daejeon (KR); Byunggook Lyu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 215 days.

(21) Appl. No.: 16/631,064

(22) PCT Filed: Sep. 14, 2018

(86) PCT No.: PCT/KR2018/010866
§ 371 (c)(1),
(2) Date: Jan. 14, 2020

(87) PCT Pub. No.: WO2019/054804
PCT Pub. Date: Mar. 21, 2019

(65) Prior Publication Data
US 2020/0153049 A1   May 14, 2020

(30) Foreign Application Priority Data

Sep. 15, 2017   (KR) ..................... 10-2017-0118856
Sep. 13, 2018   (KR) ..................... 10-2018-0109843

(51) Int. Cl.
*H01M 10/36* (2010.01)
*H01G 11/22* (2013.01)
(Continued)

(52) U.S. Cl.
CPC ............ *H01M 10/36* (2013.01); *H01G 11/22* (2013.01); *H01G 11/52* (2013.01); *H01G 11/62* (2013.01);
(Continued)

(58) Field of Classification Search
CPC ............ H01M 10/36; H01M 2220/20; H01M 2300/0002
See application file for complete search history.

(56) References Cited

U.S. PATENT DOCUMENTS 7,170,739 B1   1/2007   Arora et al.
7,510,808 B2   3/2009   Webber
(Continued)

FOREIGN PATENT DOCUMENTS

JP   2009-146756 A   7/2009
JP   2010-113963 A   5/2010
(Continued)

OTHER PUBLICATIONS

Roberts, et al.(2013).Low temperature water based electrolytes for MnO2/carbon supercapacitors Phys. Chem. Chem. Phys. vol. 15, pp. 3518-3526.
(Continued)

*Primary Examiner* — Stewart A Fraser
(74) *Attorney, Agent, or Firm* — Dentons US LLP

(57) ABSTRACT

The present invention relates to an aqueous electrolyte capable of improving low temperature performance. More specifically, the present invention provides an aqueous electrolyte that is an aqueous solution including lithium trifluoromethanesulfonate at a predetermined concentration range without separate additives, and thus can prevent freezing and realize high performance even at a very low temperature of about −30° C. or less, and an energy storage device including the same.

8 Claims, 3 Drawing Sheets

(51) Int. Cl.
   *H01G 11/52*       (2013.01)
   *H01G 11/62*       (2013.01)
(52) U.S. Cl.
   CPC ............... *H01M 2220/20* (2013.01); *H01M 2300/0002* (2013.01)

(56) References Cited

U.S. PATENT DOCUMENTS

| | | |
|---|---|---|
| 2009/0253036 A1 | 10/2009 | Owen et al. |
| 2010/0248078 A1 | 9/2010 | Beard |
| 2015/0243942 A1* | 8/2015 | Takahashi ........... H01M 50/171 429/185 |
| 2016/0351968 A1 | 12/2016 | Wang et al. |
| 2017/0222265 A1 | 8/2017 | Inoue et al. |
| 2017/0373351 A1 | 12/2017 | Kawai et al. |
| 2018/0277903 A1 | 9/2018 | Xu et al. |
| 2019/0044190 A1 | 2/2019 | Yamada et al. |

FOREIGN PATENT DOCUMENTS

| | | |
|---|---|---|
| JP | 4857608 B2 | 1/2012 |
| JP | 2013100511 A | 5/2013 |
| JP | 2014024786 A | 2/2014 |
| JP | 2014-229556 A | 12/2014 |
| JP | 2017-139224 A | 8/2017 |
| KR | 10-2008-0064963 A | 7/2008 |
| KR | 10-1171407 B1 | 8/2012 |
| KR | 10-2017-0032884 A | 3/2017 |
| KR | 10-2017-0094424 A | 8/2017 |
| WO | 2016-114141 A1 | 7/2016 |
| WO | 2017105578 A2 | 6/2017 |
| WO | 2017-122597 A1 | 7/2017 |

OTHER PUBLICATIONS

Kondo et al., "Physicochemical and Electrochemical Properties of Highly Concentrated Aqueous Electrolytes," Yokohama National Univ. Mar. 17, 2017,(4 Pages).

Ding et al., "Conductivity, Viscosity, and Their Correlation of a Super-Concentrated Aqueous Electrolyte,"U.S. Army Research Laboratory, Adelphi, Maryland, The Journal of Physical Chemistry C, vol. 121, pp. 2149-2153, Jan. 13, 2017, (5 Pages).

* cited by examiner

[FIG. 1]
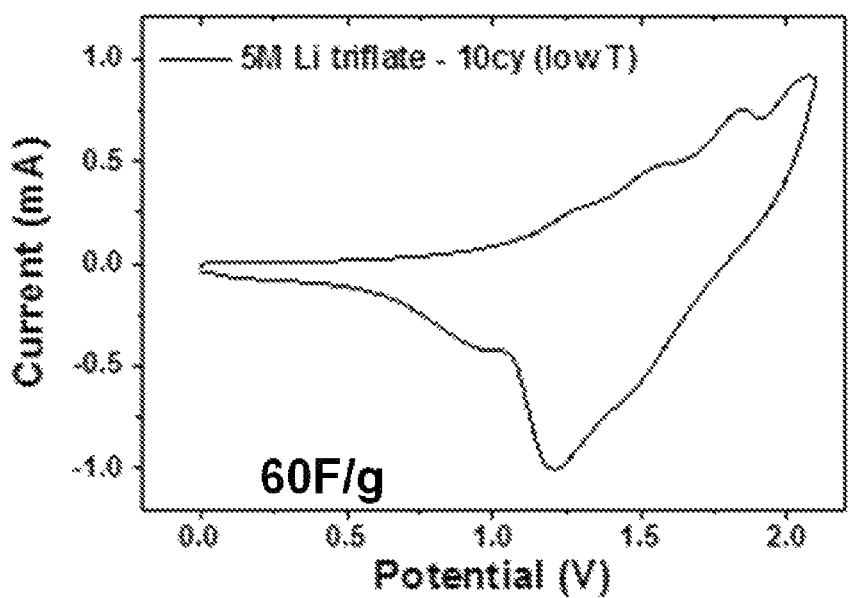
[FIG. 2]
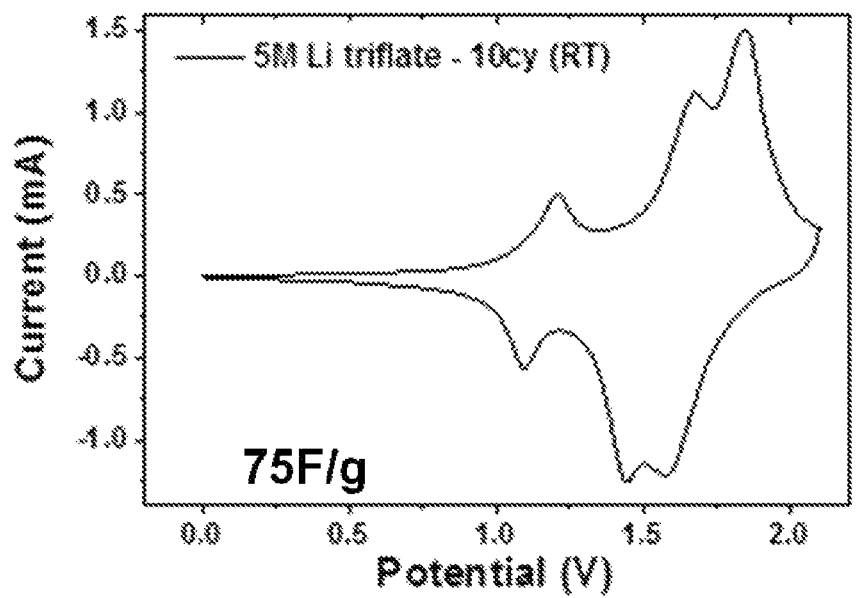

[FIG. 3]
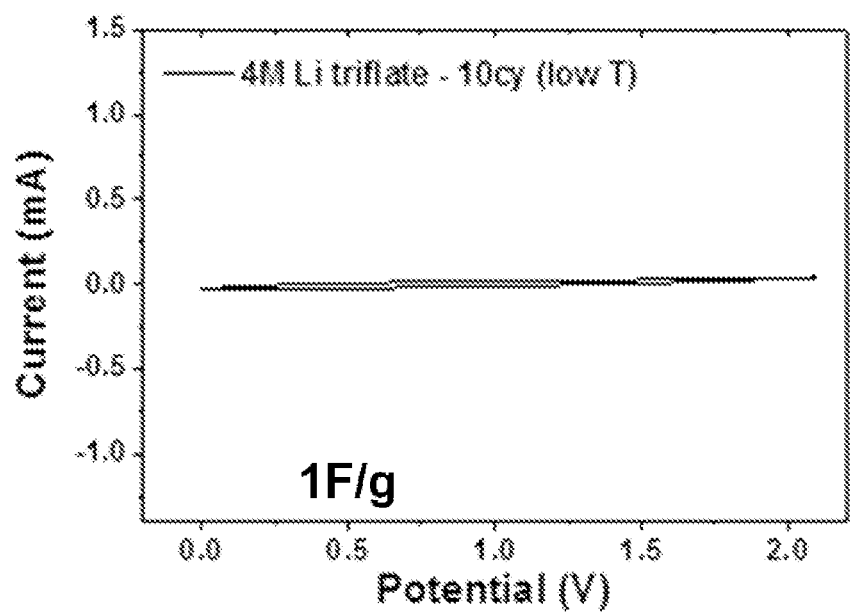
[FIG. 4]
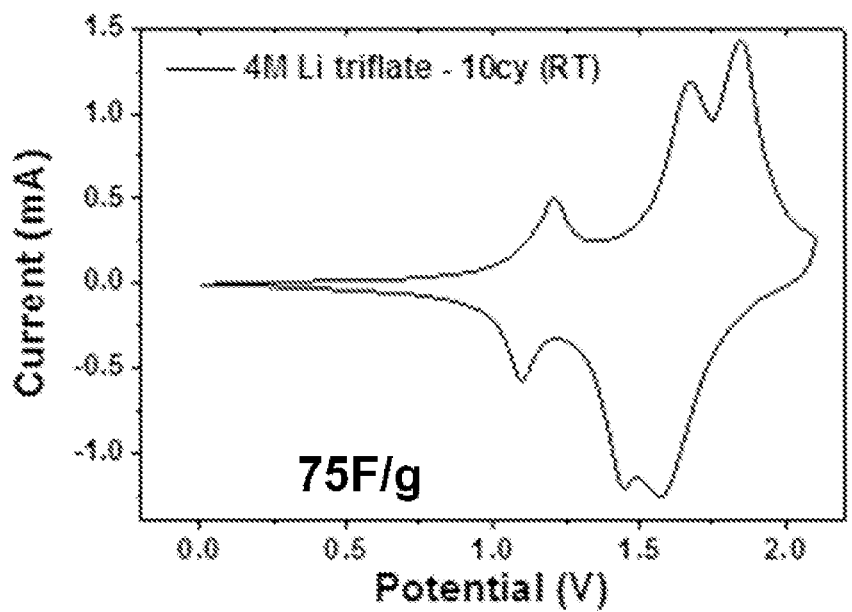

[FIG. 5]
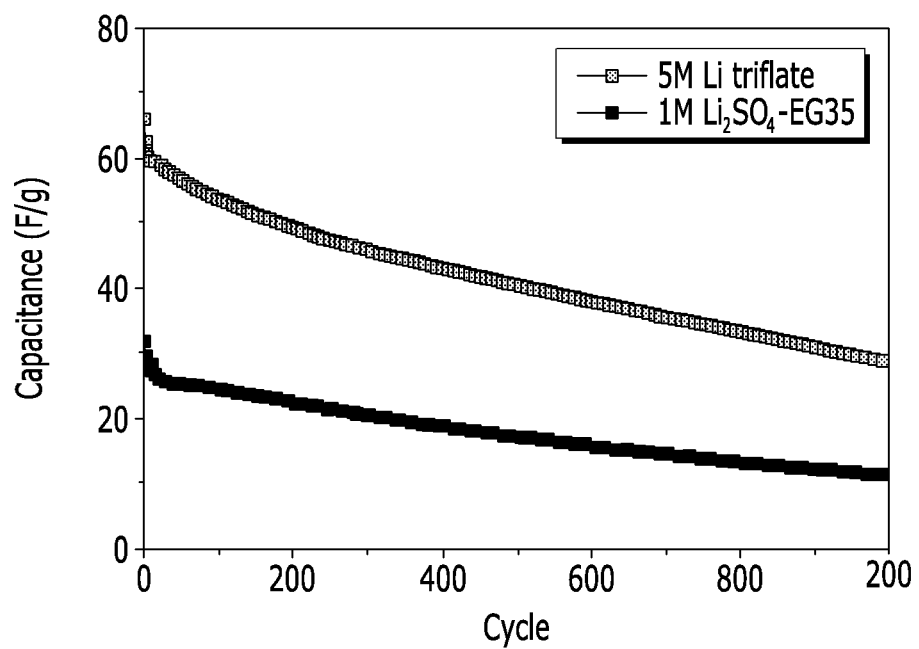

AQUEOUS ELECTROLYTE AND ENERGY STORAGE DEVICE COMPRISING THE SAME

The present application is a National Phase entry pursuant to 35 U.S.C. § 371 of International Application No. PCT/KR2018/010866 filed on Sep. 14, 2018, and claims priority to and the benefit of Korean Patent Application No. 10-2017-0118856 filed on Sep. 15, 2017 and Korean Patent Application No. 10-2018-0109843 filed on Sep. 13, 2018 with the Korean Intellectual Property Office, the disclosures of which are herein incorporated by reference in their entirety.

FIELD

The present invention relates to an aqueous electrolyte capable of improving low temperature performance, and more specifically, to an aqueous electrolyte that uses specific lithium salts only, and thus can prevent freezing and realize high performance even at a very low temperatures, and an energy storage device including the same.

BACKGROUND

With a worldwide increase in energy demand, interest in energy storage technology is growing more and more. With the proliferation of mobile phones, camcorders, notebook PCs, and even to electric automobile energy, efforts to study and develop electrochemical devices are increasing.

Particularly, interest in rechargeable secondary batteries has recently been on the rise, and among currently applied secondary batteries, lithium secondary batteries developed in the early 1990s are in the spotlight due to their high operation voltage and extraordinarily high energy density. In addition, energy storage devices having higher density than existing capacitors and having higher output than common lithium ion batteries, such as supercapacitors are being studied in many ways. Supercapacitors may be simply classified into electrical double layer capacitors (EDLC) and pseudocapacitors, according to the energy storage mechanism.

Most of such energy storage devices consist of a cathode (positive electrode) and an anode (negative electrode) consisting of carbon material or a transition metal oxide and the like, and a non-aqueous electrolyte. However, non-aqueous electrolytes consisting of organic solvents, used in lithium ion batteries, pseudocapacitors, supercapacitors, and the like, have high combustibility and thus lowered stability, and have low ion conductivity. Thus, non-aqueous electrolytes are limited in the application for high output products. Therefore, there are many studies on the use of aqueous electrolytes in lithium ion batteries pseudocapacitors, supercapacitors, and the like, in order to increase stability and output. However, in the case of existing aqueous electrolytes, electrolyte freezing occurs at a temperature of less than 0° C., thus causing performance deterioration. Therefore, in the application of an aqueous electrolyte for a battery system, it is necessary to improve low temperature stability. Although studies on antifreeze additives for an electrolyte such as ethylene glycol have been reported so as to prevent electrolyte freezing, it is difficult to directly apply them for commercialized products of energy storage devices, due to problems including an increase in the viscosity of an electrolyte by the additives, a decrease in ion conductivity, electrochemical side reactions of the additives, and the like.

Particularly, in the case of lithium ion batteries, severe power dissipation is generated at a temperature below freezing. Even charging is difficult under a low temperature conditions. In the case of electric automobiles, regenerative braking capacity is lowered. It is known that the cruising distance of electric automobiles decreases by about 40% at a low temperature. In order to operate a cold engine, expensive batteries with large capacity should be installed. In order to increase the performance of lithium ion batteries at a low temperature, additives have been used in the battery electrolyte, or external insulation and warming apparatuses have been used. However, the former discharges gas thereby reducing battery life at a high temperature, and the latter increases the size of a battery.

Therefore, there is a need to develop an aqueous electrolyte that can realize high output energy storage devices having excellent stability and high ion conductivity, without using additives such as ethylene glycol and the like.

It is an object of the present invention to provide an aqueous electrolyte that uses lithium trifluoromethanesulfonate in a predetermined range without additives such as ethylene glycol and the like, and thus can prevent freezing and realize high performance at a low temperature without side-effects such as an increase in viscosity and a decrease in ion conductivity, and the like.

It is another object of the present invention to provide an energy storage device including the above-explained aqueous electrolyte.

According to one embodiment of the invention, an aqueous electrolyte consisting of an aqueous solution including lithium trifluoromethanesulfonate at a concentration of 4.5 mol/L to 10 mol/L, is provided.

For example, the aqueous solution may include lithium trifluoromethanesulfonate at a concentration of 5 mol/L to 7 mol/L, and the content of the lithium trifluoromethanesulfonate may be 41 wt % to 77 wt %, based on the total weight of the aqueous solution.

Further, the aqueous solution may include only lithium trifluoromethanesulfonate and a remaining amount of water.

The aqueous electrolyte may have ion conductivity measured at room temperature (25° C.) of 55 mS/cm or more, and ion conductivity measured at a very low temperature (−30° C.) of 6 mS/cm or more.

Meanwhile, according to another embodiment of the invention, an energy storage device including the above-explained aqueous electrolyte is provided. The energy storage device includes a cathode (positive electrode) including a cathode active material; an anode (negative electrode) including an anode active material; a separator interposed between the cathode and the anode; and an aqueous electrolyte consisting of an aqueous solution including lithium trifluoromethanesulfonate at a concentration of 4.5 mol/L to 10 mol/L.

For example, the energy storage device may be a supercapacitor, a pseudocapacitor, or a lithium ion battery.

Further, the energy storage device may have a specific capacitance measured by cyclic voltammetry after leaving it at −30° C. for 6 hours or more of 60% or more of the specific capacitance measured by cyclic voltammetry after leaving it at 25° C. for 6 hours or more.

According to the present invention, by using lithium trifluoromethanesulfonate at a predetermined concentration range without separate additives in an aqueous electrolyte, freezing may be prevented and high capacitance can be realized even at a very low temperature of about −30° C. or lower.

BRIEF DESCRIPTION OF THE DRAWINGS

FIG. 1 is a $10^{th}$ cycle CV graph, determined by cyclic voltammetry after leaving it at a very low temperature (low T, −30° C. C) for 6 hours or more, for a full cell using the aqueous electrolyte (including 5 M Li triflate) prepared according to Example 1 (specific capacitance: 60 F/g).

FIG. 2 is a $10^{th}$ cycle CV graph, determined by cyclic voltammetry after leaving it at room temperature (RT, 25° C.) for 6 hours or more, for a full cell using the aqueous electrolyte (including 5 M Li triflate) prepared according to Example 1 (specific capacitance: 75 F/g).

FIG. 3 is a $10^{th}$ cycle CV graph, determined by cyclic voltammetry after leaving it at a very low temperature (low T, −30° C.) for 6 hours or more, for a full cell using the aqueous electrolyte (including 4 M Li triflate) prepared according to Comparative Example 1 (specific capacitance: less than 1 F/g).

FIG. 4 is a $10^{th}$ cycle CV graph, determined by cyclic voltammetry after leaving it at room temperature (RT, 25° C.) for 6 hours or more, for a full cell using the aqueous electrolyte (including 4 M Li triflate) prepared according to Comparative Example 1 (specific capacitance: 75 F/g).

FIG. 5 is a graph showing constant current (1 A/g) evaluation results to 2.1 V, after leaving it at a very low temperature (low T, −30° C.) for 6 hours or more, for the full cells using the aqueous electrolyte (including 5 M Li triflate) prepared according to Example 1, and the aqueous electrolyte (including 1 M $Li_2SO_4$—35 vol % EG) prepared according to Comparative Example 2.

DETAILED DESCRIPTION

As used herein, terms "first", "second", and the like are used to explain various constructional elements, and they are used only to distinguish one constructional element from other constructional elements.

Further, the terms used herein are only to explain specific embodiments, and are not intended to limit the present invention. A singular expression includes a plural expression thereof, unless it is expressly stated or obvious from the context that such is not intended. As used herein, the terms "comprise", "equipped", "have", etc. are intended to designate the existence of a practiced characteristic, number, step, constructional element, or combinations thereof, and they are not intended to preclude the possibility of existence or addition of one or more other characteristics, numbers, steps, constructional elements, or combinations thereof.

As used herein, room temperature may be, for example, about 23° C. to 30° C., preferably 25° C.

Although various modifications can be made to the present invention and the present invention may have various forms, specific examples will be illustrated and explained in detail below. However, it should be understood that these are not intended to limit the present invention to a specific disclosure, and that the present invention includes all modifications, equivalents, or replacements thereof without departing from the spirit and technical scope of the invention.

Hereinafter, the present invention will be explained in detail.

According to one embodiment of the invention, an aqueous electrolyte consisting of an aqueous solution including lithium trifluoromethanesulfonate at a concentration of 4.5 mol/L to 10 mol/L is provided.

The present invention relates to an aqueous electrolyte of an aqueous phase, not a non-aqueous electrolyte consisting of organic solvents, and is characterized by using lithium trifluoromethanesulfonate (lithium triflate, LiTf, $CF_3SO_3Li$) at a specific concentration without separate additives such as ethylene glycol or propylene glycol and the like, thereby preventing low temperature freezing and realizing capacitance of about 2 times better than existing aqueous electrolyte including additives.

Particularly, the low temperature properties of secondary batteries are important because most applications of secondary batteries are operated outdoors. For example, in the case of as HEV and a PHEV, since output at a low temperatures is important, there is an attempt to minimizing performance deterioration even under severe conditions of −30° C. to −40° C. in industries relating to automobile batteries. Furthermore, since performance deterioration is rapidly generated if a temperature falls to below zero, a performance difference under the conditions of −10° C. and −30° C. is very large.

Meanwhile, the aqueous electrolyte of the present invention consists of an aqueous solution including only lithium trifluoromethanesulfonate and a remaining amount of water without separate additives.

The aqueous electrolyte uses lithium trifluoromethanesulfonate (lithium triflate) at a concentration of 4.5 mol/L to 10 mol/L in an aqueous solution. The concentration of the lithium trifluoromethanesulfonate may preferably be 4.8 mol/L to 8 mol/L, or 5 mol/L to 7 mol/L. The lithium trifluoromethanesulfonate should be included at a concentration of 4.5 mol/L or more so that the energy storage device using the aqueous electrolyte may exhibit high capacitance as well as excellent freezing preventing performance at a very low temperature of about −30° C. or lower. For example, even if an aqueous electrolyte includes lithium trifluoromethanesulfonate, if the concentration of lithium trifluoromethanesulfonate is less than 4.5 mol/L, ion conductivity may decrease due to freezing of the electrolyte. Further, the concentration of lithium trifluoromethanesulfonate should be 10 mol/L or less, so as to not generate deterioration of high output performance and a decrease in ion conductivity due to an excessive increase in viscosity.

The content of lithium trifluoromethanesulfonate may be 41 wt % to 77 wt %, preferably 42 wt % to 70 wt %, or 43.5 wt % to 61 wt %, based on the total weight of the aqueous solution. Thus, among the total of 100 wt % of the aqueous solution, a remaining content (wt %) other than the content of lithium trifluoromethanesulfonate in the above-explained range may correspond to the content of water. For example, the aqueous electrolyte may include 41 wt % or more and less than 77 wt % of lithium trifluoromethanesulfonate, and 23 wt % or more and less than 59 wt % of water, based on the total weight of the aqueous solution.

Since the aqueous electrolyte consists only of lithium trifluoromethanesulfonate and water, without using additives such as ethylene glycol or propylene glycol, an increase in the viscosity of the electrolyte and a decrease in the ion conductivity may not be generated, and other problems resulting from the electrochemical side reactions of the additives may not occur.

Particularly, in the present invention, the ion conductivity of the electrolyte, namely, lithium ion conductivity, may be 55 mS/cm or more, or 55 mS/cm to 85 mS/cm, 60 mS/cm or more, or 60 mS/cm to 85 mS/cm, 70 mS/cm or more, or 70 mS/cm to 85 mS/cm, 72 mS/cm or more, or 72 mS/cm to 85 mS/cm, at room temperature (about 25° C.), so that the moving speed of lithium ions (Li+) may be maintained high even at a very low temperature of about −30° C. or less as well as at a room temperature, and diffusion of lithium ions (Li+) into the electrode active material may be properly achieved, and thus the reaction of the electrode may uniformly occur. In addition, the aqueous electrolyte may have ion conductivity, namely, lithium ion conductivity, at a very low temperature of about −30° C. or less, or −30° C. to −60° C., of 6 mS/cm or more, or 6 mS/cm to 25 mS/cm, 8 mS/cm or more, or 8 mS/cm to 25 mS/cm, 11 mS/cm or more, or 11 mS/cm to 25 mS/cm, 12 mS/cm or more, or 12 mS/cm to 25 mS/cm. If the lithium ion conductivity of the aqueous electrolyte is less than 40 mS/cm at room temperature or less than 6 mS/cm at a very low temperature, the moving speed of lithium ions in the electrode may be lowered, and thus reactions may not occur uniformly on the electrode surface and inside of the electrode under respective conditions, thereby deteriorating charge/discharge efficiency and cycle performance. However, if the lithium ion conductivity of the aqueous electrolyte is greater than 85 mS/cm at room temperature or greater than 25 mS/cm at a very low temperature, compared to the absorption/desorption speed of lithium ions at the cathode and the anode, the moving speed of lithium ions at a separator may be lowered, and thus lithium ions may be accumulated at the interface between the electrode and separator, thus generating side reactions with the electrolyte.

In the present invention, a method of measuring lithium ion conductivity is not specifically limited, and any methods commonly used in the art may be used. For example, lithium ion conductivity may be measured using a conductivity measuring device such as a F230K device. The lithium ion conductivity may vary according to the lot of solvents or conditions of measuring devices.

Meanwhile, according to another embodiment of the invention, an energy storage device including the above-explained aqueous electrolyte is provided.

The energy storage devices includes: a cathode (positive electrode) including a cathode active material; an anode (negative electrode) including an anode active material; a separator interposed between the cathode and the anode; and an aqueous electrolyte consisting of an aqueous solution including lithium trifluoromethanesulfonate at a concentration of 4.5 mol/L to 10 mol/L.

More specifically, in the energy storage device, the cathode may include a cathode active material, a binder, and a conductive material, and the anode may include an anode active material, a binder, and a conductive material.

The energy storage device includes an aqueous electrolyte of an aqueous solution phase, instead of a non-aqueous electrolyte consisting of organic solvents, and by including an aqueous electrolyte using lithium trifluoromethanesulfonate at a specific concentration without separate additives such as ethylene glycol or propylene glycol, low temperature freezing is prevented, and capacitance of about 2 times better than existing aqueous electrolyte including additives may be realized.

The energy storage device of the present invention may be a supercapacitor, a pseudocapacitor, or a lithium ion battery.

In the energy storage device, specific compositions of the aqueous electrolyte, and the characteristics and properties of lithium trifluoromethanesulfonate, are as explained above.

In the energy storage device according to one embodiment of the present invention, the cathode active material may include a manganese spinel-based active material, a lithium metal oxide, a metal oxide, polyanionic compounds, activated carbon, or a carbon composite, or mixture thereof. The lithium metal oxide may be selected from the group consisting of a lithium-manganese oxide, a lithium-nickel-manganese oxide, a lithium-manganese-cobalt oxide, a lithium-nickel-manganese-cobalt oxide, and a lithium-nickel-cobalt oxide, and the metal oxide may be vanadium oxide, manganese oxide, and the like. For example, as the cathode active material, layered compounds such as lithium cobalt oxide ($LiCoO_2$) and lithium nickel oxide ($LiNiO_2$), unsubstituted or substituted with one or more transition metals; a lithium manganese oxide such as $Li_{1+y}Mn_{2-y}O_4$ (wherein y is 0 to 0.33, e.g., $LiMn_2O_4$), $LiMnO_3$, $LiMn_2O_3$, $LiMnO_2$, and the like; lithium copper oxide ($Li_2CuO_2$); a vanadium oxide such as $LiV_3O_8$, $LiFe_3O_4$, $V_2O_5$, $Cu_2V_2O_7$, and the like; a Ni-site lithium nickel oxide represented by $LiNi_{1-y}M_yO_2$ (wherein M=Co, Mn, Al, Cu, Fe, Mg, B, or Ga, and y=0.01 to 0.3); a lithium manganese complex oxide represented by $LiMn_{2-y}M_yO_2$ (wherein, M=Co, Ni, Fe, Cr, Zn, or Ta, and y=0.01 to 0.1) or $Li_2Mn_3MO_8$ (wherein M=Fe, Co, Ni, Cu, or Zn); a lithium metal oxide of the above chemical formulas wherein a part of Li is substituted with alkali earth metal ions; disulfide compounds; $Fe_2(MoO_4)_3$: and the like, may be mentioned, but the cathode active material is not limited thereto.

As the anode active material, a lithium metal oxide, a metal oxide, activated carbon, polyanionic compounds, or a carbon composite or mixture thereof may be mentioned. For example, as representative examples of the anode active material, non-crystalline carbon, crystalline carbon such as carbon graphite, hard carbon, and the like may be mentioned; and other metal complex oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, Group 2, Group 3 atoms of the periodic table, a halogen; $0<x\leq1$; $1\leq y\leq 3$; $1\leq z\leq 8$), or $LiTi_2(PO_4)_3$, and the like; a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, and the like; a conductive polymer such as polyacetylene and the like; a Li—Co—Ni material; and the like, may be used, but the anode active material is not limited thereto, and a commonly used anode active material may be used without limitation.

Specifically, the cathode or anode may be prepared, for example, by mixing a mixture of a cathode or anode active material, a conductive material, and a binder with a solvent to prepare slurry, and then coating the slurry on a cathode or anode current collector, and drying it.

According to one embodiment of the present invention, the cathode current collector is generally formed to a thickness of 5 micrometers to 200 micrometers. Such a cathode current collector is not specifically limited as long as it has high conductivity without inducing a chemical change in the corresponding battery. For example, stainless steel, aluminum, nickel, titanium, baked carbon, or aluminum or stainless steel, of which surface is treated with carbon, nickel, titanium, silver, and the like, may be used.

On the surface of the cathode current collector, fine unevenness may be formed to increase adhesion with the cathode active material, and it may be used in various shapes such as a film, a sheet, a foil, a net, a porous body, a foam body, a non-woven body, and the like.

The anode current collector is generally formed to a thickness of 5 micrometers to 200 micrometers. Such an anode current collector is not specifically limited as long as it has high conductivity without inducing a chemical change in the corresponding battery, and for example, copper, stainless steel, aluminum, nickel, titanium, baked carbon, or copper or stainless steel of which surface is treated with carbon, nickel, titanium, silver, and the like, an aluminum-cadmium alloy, and the like, may be used. Further, like the cathode current collector, fine unevenness may be formed on the surface to increase adhesion with the anode active material, and it may be used in various shapes such as a film, a sheet, a foil, a net, a porous body, a foam body, a non-woven body, and the like.

The conductive material used in the cathode or anode slurry is commonly added in the content of 1 wt % to 20 wt %, based on the total weight of the mixture including the cathode or anode active material. The conductive material is not specifically limited as long as it has conductivity without inducing a chemical change in the corresponding battery, and for example, graphite such as natural graphite, artificial graphite, and the like; a carbon black such as carbon black, acetylene black, ketjen black, channel black, furnace black, lamp black, summer black, and the like; a conductive fiber such as carbon fiber, metal fiber, and the like; a metal powder such as fluorinated carbon, aluminum nickel powder, and the like; conductive whiskers such as zinc oxide, potassium titanate, and the like; a conductive oxide such as titanium oxide and the like; polyphenylene derivatives; a conductive material such as carbon nanotubes, graphene, and the like, may be used.

The binder is a component assisting in binding of the cathode or anode active material with the conductive material, and binding to a current collector, commonly is added in an amount of 1 wt % to 20 wt %, based on the total weight of the mixture including the cathode or anode active material. As the binder, various kinds of binder polymers such as a polyvinylidene fluoride-hexafluoropropylene copolymer (PVDF-co-HEP), polyvinylidene fluoride (PVDF), polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), sulfonated EPDM, styrene butadiene rubber (SBR), fluorine rubber, various copolymers, and the like, may be used.

Further, as preferable examples of the solvent, dimethyl sulfoxide (DMSO), alcohols, N-methylpyrrolidone(NMP), acetone, water, and the like, may be mentioned, and it is removed during a drying process.

As the separator, common porous polymer films previously used as separators, for example, porous polymer films prepared with a polyolefin-based polymer such as an ethylene homopolymer, a propylene homopolymer, an ethylene/butene copolymer, an ethylene/hexene copolymer, an ethylene/methacrylate copolymer, and the like, may be used alone or laminated, or a common porous non-woven fabric, for example, a non-woven fabric made of high melting glass fiber, polyethylene terephthalate fiber, and the like may be used, but the separator is not limited thereto.

As a battery case used in the present invention, those commonly used in the art may be adopted, and the shape is not limited according to the use of batteries, and for example, it may have a cylindrical shape using a can, a square shape, a button-type, a sheet-type, a pouch-type, or a coin-type, and the like.

Particularly, the energy storage device according to the present invention can maintain high performance, with specific capacitance measured by cyclic voltammetry after leaving the energy storage device at −30° C. for 6 hours or more, being 60% or more, or 62% or more, preferably 70% or more, or 75% or more, more preferably 80% or more, of the specific capacitance measured by cyclic voltammetry after leaving it at 25° C. for 6 hours or more. For example, the energy storage device may exhibit electric performance measured at a low temperature, which is 60% or more of the performance measured at room temperature, even at high output of about 1 A/g or more.

More specifically, in order to measure the electrical properties of the energy storage device including the aqueous electrolyte according to one embodiment, the cathode active material $LiMn_2O_4$ and the anode active material $LiTi_2(PO_4)_3$ are respectively used in NMP (N-methyl-2-pyrrolidone), and a solution including the cathode or anode active material, acetylene black as a conductive material for transferring current, and polyvinylidene fluoride (PVDF) as a binder for fixing particles at a weight ratio of 7:2:1 is coated on a Ni thin film electrode and dried, and then roll pressed to prepare a cathode and an anode, respectively, and the specific capacitance may be measured by cyclic voltammetry. Herein, the energy storage device including the aqueous electrolyte may have specific capacitance measured by cyclic voltammetry after leaving it at room temperature (25° C.) for 6 hours or more, of 70 F/g or more, or 70 F/g to 85 F/g, preferably 72 F/g or more, or 72 F/g to 85 F/g, more preferably 73 F/g or more, or 73 F/g to 85 F/g. Further, the energy storage device including the aqueous electrolyte may have specific capacitance measured by cyclic voltammetry after leaving it at −30° C. for 6 hours or more, of 35 F/g or more, or 35 F/g to 70 F/g, preferably 40 F/g or more, or 40 F/g to 70/g, more preferably 55 F/g or more, or 55 F/g to 70 F/g.

In the present invention, since particulars other than those described above may be adjusted as necessary, they are not specifically limited.

Hereinafter, preferable examples are presented for better understanding of the present invention. However, these examples are presented only as illustrations of the present invention, and the scope of the present invention is not limited thereby.

EXAMPLES

Example 1

To 100 mL of water as an aqueous solution solvent, 78.03 g (43.8 wt %) of lithium trifluoromethanesulfonate (lithium triflate, LiTf, $CF_3SO_3Li$) was added to prepare an aqueous electrolyte at a concentration of 5 mol/L.

Example 2

To 100 mL of water as an aqueous solution solvent, 70.2 g (41.25 wt %) of lithium trifluoromethanesulfonate was added to prepare an aqueous electrolyte at a concentration of 4.5 mol/L.

Example 3

To 100 mL of water as an aqueous solution solvent, 109.21 g (52.2 wt %) of lithium trifluoromethanesulfonate was added to prepare an aqueous electrolyte at a concentration of 7 mol/L.

Comparative Example 1

To 100 mL of water as an aqueous solution solvent, 62.42 g (38.4 wt %) of lithium trifluoromethanesulfonate was added to prepare an aqueous electrolyte at a concentration of 4 mol/L.

Comparative Example 2

To 100 mL of water as an aqueous solution solvent, 10.99 g (9.9 wt %) of lithium sulfate($Li_2SO_4$) was added to prepare an aqueous electrolyte at a concentration of 1 mol/L.

Comparative Example 3

To 65 mL of water as an aqueous solution solvent, 10.99 g (1 mol/L) of lithium sulfate($Li_2SO_4$) and 35 mL of ethylene glycol(EG, 35 vol %) were added to prepare an aqueous electrolyte.

Comparative Example 4

To 100 mL of water as an aqueous solution solvent, 234.02 g (70.06 wt %) of lithium sulfate ($Li_2SO_4$) was added to prepare an aqueous electrolyte at a concentration of 15 mol/L.

Comparative Example 5

To 100 mL of water as an aqueous solution solvent, 327.62 g (76.6 wt %) of lithium trifluoromethanesulfonate was added to prepare an aqueous electrolyte at a concentration of 21.0 mol/L.

Experimental Example 1

For the aqueous electrolytes prepared according to Examples 1-3 and Comparative Examples 1-5, ion conductivities were measured with a conductivity measuring device F230K (Mettler Toledo), after leaving them under room temperature (25° C.) and very low temperature (−30° C.) conditions, respectively, for 6 hours or more, and the measurement results are shown in the following Table 1.

TABLE 1

| | Composition | Room temperature ion conductivity (25° C., mS/cm) | Very low temperature ion conductivity (−30° C., mS/cm) | Whether or not frozen at a very temperature (−30° C.) |
|---|---|---|---|---|
| Example 1 | $CF_3SO_3Li$, 5 mol/L | 73-78 | 13.5-14 | No freezing |
| Example 2 | $CF_3SO_3Li$, 4.5 mol/L | 72-75 | 12.8-13.5 | No freezing |
| Example 3 | $CF_3SO_3Li$, 7 mol/L | 61.7-63.2 | 11.4 | No freezing |
| Comparative Example 1 | $CF_3SO_3Li$, 4 mol/L | 71-74 | 5.1-5.4 | Freezing generated |
| Comparative Example 2 | $Li_2SO_4$, 1 mol/L | 60-63 | 0 | Freezing generated |
| Comparative Example 3 | $Li_2SO_4$, 1 mol/L; EG 35 vol % | 24.7-25.5 | 3.7-4 | No freezing |
| Comparative Example 4 | $CF_3SO_3Li$, 15 mol/L | 26.2-28.3 | 2.7 | No freezing |
| Comparative Example 5 | $CF_3SO_3Li$, 21 mol/L | 14.4-15.8 | 0 | No freezing |

As shown in the Table 1, the aqueous electrolytes of Examples 1-3 according to the present invention, which includes lithium trifluoromethanesulfonate at predetermined concentration ranges without separate additives, are not frozen at a very low temperature (−30° C.), and have excellent properties with ion conductivities at room temperature (25° C.) of 61.7 mS/cm to 78 mS/cm, and ion conductivities even at a very low temperature (−30° C.) of 11.4 mS/cm to 14 mS/cm.

To the contrary, in the case of the electrolyte of Comparative Example 1 wherein lithium trifluoromethanesulfonate is used at the concentration of 4 M, and the electrolyte of Comparative Example 2 including 1 M $Li_2SO_4$ without EG, freezing was generated at a very low temperature (−30° C.), and ion conductivity was lowered to 5.4 mS/cm or less, or was not measurable at a very low temperature (−30° C.). Further, in the case of the electrolyte of Comparative Example 3 including EG as well as 1 M $Li_2SO_4$, and the electrolytes of Comparative Examples 4-5 including lithium trifluoromethanesulfonate at the concentrations of 15 M and 21 M, respectively, freezing was not generated under a very low temperature (−30° C.) condition, but ion conductivities at room temperature (25° C.) were remarkably lowered to 14.4 mS/cm to 28.3 mS/cm, and ion conductivities at a very low temperature (−30° C.) were also lowered to 2.7 mS/cm to 4 mS/cm or were not measurable.

Experimental Example 2

The aqueous electrolytes of Examples 1-3 and Comparative Examples 1-5 were used to manufacture batteries as follows, and then low temperature performances of the electrolytes were evaluated, and the measurement results are shown in the following Table 2.

Manufacture of Batteries 70 wt % of $LiMn_2O_4$ as a cathode active material, 20 wt % of acetylene black as a conductive material, and 10 wt % of PVDF (polyvinylidene fluoride) as a binder were added to a solvent of NMP (N-methylpyrrolidone), thus preparing a cathode mixture slurry. The cathode mixture slurry was coated on a cathode current collector of a Ni thin film having a thickness of about 20 micrometers, and dried, and then roll-pressed to prepare a cathode.

Further, 70 wt % of $LiTi_2(PO_4)_3$ as an anode active material, 10 wt % of PVDF (polyvinylidene fluoride) as a binder, and 20 wt % of acetylene black as a conductive material were added to a solvent of NMP (N-methylpyrrolidone) to prepare an anode mixture slurry. The anode mixture slurry was coated on an anode current collector of a Ni thin film having a thickness of about 20 micrometers, and dried, and then roll-pressed to prepare an anode.

The cathode and anode thus prepared, and a glass fiber separator, were used to manufacture a coin cell (2032 standard) battery by a common method. For performance comparison, the 5 M Li triflate aqueous electrolyte of Example 1, the 4 M Li triflate aqueous electrolyte of Comparative Example 1, the 1 M $Li_2SO_4$ aqueous electrolyte of Comparative Example 2, and the 1 M $Li_2SO_4$ electrolyte with 35 vol % ethylene glycol (EG) of Comparative Example 3 were respectively introduced.

Constant Current Evaluation

The manufactured coin cell was left at a low temperature (−30° C.) for 6 hours or more, and then constant current evaluation was conducted until 2.1 V.

Evaluation of Specific Capacitance

The manufactured coin cell was left at room temperature (25° C.) and a low temperature (−30° C.), respectively, for 6 hours or more, and then specific capacitance was measured by cyclic voltammetry.

TABLE 2

| | Results of constant current evaluation (F/g, −30° C.) | Results of specific capacitance (F/g, −30° C.) | Results of specific capacitance (F/g, 25° C.) |
|---|---|---|---|
| Example 1 | 65 | 60 | 75 |
| Example 2 | 46 | 52 | 74 |
| Example 3 | 44 | 47 | 75 |
| Comparative Example 1 | Less than 1 | Less than 1 | 75 |
| Comparative Example 2 | 0 | 0 | 75 |
| Comparative Example 3 | 34 | 34 | 74 |
| Comparative Example 4 | 2 | 3 | 62 |
| Comparative Example 5 | 0 | 0 | 51 |

Further, for the full cells using the aqueous electrolytes of Example 1 and Comparative Example 1, the $10^{th}$ cycle graphs determined by cyclic voltammetry after leaving them at a very low temperature (low T, −30° C.) for 6 hours or more are respectively shown in FIG. 1 and FIG. 3, and the $10^{th}$ cycle CV graphs determined by cyclic voltammetry after leaving them at room temperature (RT, 25° C.) for 6 hours or more are respectively shown in FIG. 2 and FIG. 4. Additionally, for the full cells using the aqueous electrolyte prepared according to Example 1 (including 5 M Li triflate) and the aqueous electrolyte prepared according to Comparative Example 2 (including 1 M $Li_2SO_4$—35 vol % EG), after leaving them at a very low temperature (low T, −30° C.) for 6 hours or more, the graph showing the constant current (1 A/g) evaluation until 2.1 V is shown in FIG. 5.

As shown in Table 2, the aqueous electrolytes of Examples 1-3 including lithium trifluoromethanesulfonate at predetermined concentration ranges without separate additives according to the present invention exhibit excellent capacitance and specific capacitance both under room temperature and very low temperature conditions. Particularly, it can be seen that the batteries using the aqueous electrolytes of Examples 1-3 can maintain performance at a very high rate, with specific capacitance measured after leaving them at −30° C. for 6 hours or more being about 62.7% to about 80% of the specific capacitance measured after leaving them at 25° C. for 6 hours or more.

To the contrary, in the performance evaluation results of the batteries using the aqueous electrolytes of Comparative Examples 1-5, in the case of Comparative Example 2 and Comparative Example 5, capacitance and specific capacitance could not be measured at all, and Comparative Examples 1 and 4 exhibited just less than 1 F/g and 2 F/g to 3 F/g, respectively, while Comparative Example 3 exhibited just about 46% of the specific capacitance measured at room temperature.

Particularly, in the case of the 1 M $Li_2SO_4$ electrolyte of Comparative Example 2 without EG, capacitance was not measurable due to the freezing of the electrolyte, and in the case of the 5 M Li triflate electrolyte of Example 1, low temperature capacitance was increased by about 2 or more times, compared to the electrolyte of Comparative Example 3 using the EG additive, and in the case of the aqueous electrolyte of Comparative Example 1 using lithium trifluoromethanesulfonate at a concentration of 4 M, capacitance was remarkably lowered to less than 1 F/g.

The invention claimed is:

1. An aqueous electrolyte consisting of an aqueous solution comprising lithium trifluoromethanesulfonate at a concentration of 4.5 mol/L to 10 mol/L.

2. The aqueous electrolyte according to claim 1, wherein the aqueous solution comprises lithium trifluoromethanesulfonate at a concentration of 5 mol/L to 7 mol/L.

3. The aqueous electrolyte according to claim 1, wherein the content of the lithium trifluoromethanesulfonate is 41 wt % to 77 wt %, based on the total weight of the aqueous solution.

4. The aqueous electrolyte according to claim 1, wherein ion conductivity measured at 25° C. is 55 mS/cm or more.

5. The aqueous electrolyte according to claim 1, wherein ion conductivity measured at −30° C. is 6 mS/cm or more.

6. An energy storage device comprising:
a cathode comprising a cathode active material;
an anode comprising an anode active material;
a separator interposed between the cathode and the anode; and
an aqueous electrolyte consisting of an aqueous solution comprising lithium trifluoromethane sulfonate at a concentration of 4.5 mol/L to 10 mol/L.

7. The energy storage device according to claim 6, wherein the energy storage device is a supercapacitor, a pseudocapacitor, or a lithium ion battery.

8. The energy storage device according to claim 6, wherein the specific capacitance measured by cyclic voltammetry after leaving it at −30° C. for 6 hours or more is 60% or more of the specific capacitance measured by cyclic voltammetry after leaving it at 25° C. for 6 hours or more.

* * * * *